United States Patent [19]
Corey

[11] 4,353,704
[45] Oct. 12, 1982

[54] PILOTED FLEXIBLE COUPLING

[75] Inventor: Dennis J. Corey, Youngsville, Pa.

[73] Assignee: Rexnord Inc., Milwaukee, Wis.

[21] Appl. No.: 135,051

[22] Filed: Mar. 28, 1980

[51] Int. Cl.³ .............................................. F16D 3/78
[52] U.S. Cl. ...................................... 464/72; 464/137
[58] Field of Search .............. 64/13, 15 R, 15 B, 11 F

[56] References Cited

U.S. PATENT DOCUMENTS

| | | | |
|---|---|---|---|
| 2,182,711 | 12/1939 | Thomas | 64/13 |
| 2,712,741 | 7/1955 | Roller | 64/13 |
| 2,846,857 | 8/1958 | Hagenlocher | 64/13 |
| 3,405,760 | 10/1968 | Smith | 165/94 |
| 3,500,658 | 3/1970 | Goody | 64/13 |
| 3,654,775 | 4/1972 | Williams | 64/13 |
| 3,703,817 | 11/1972 | Orwin | 64/13 |
| 3,768,276 | 10/1973 | Caldwell et al. | 64/11 R |
| 4,055,966 | 11/1977 | Federicks | 64/19 |
| 4,073,161 | 2/1978 | Bury | 64/13 |
| 4,096,711 | 6/1978 | Carlson et al. | 64/13 |
| 4,191,030 | 3/1980 | Calistrat | 64/13 |

FOREIGN PATENT DOCUMENTS

| | | |
|---|---|---|
| 2834070 | 2/1980 | Fed. Rep. of Germany . |
| 7130552 | 4/1972 | France . |
| 7630228 | 5/1977 | France . |

*Primary Examiner*—Ira S. Lazarus
*Attorney, Agent, or Firm*—Theresa F. Camoriano; Vance A. Smith

[57] ABSTRACT

A piloted flexible torque transmission coupling including circumferentially spaced, axially aligned holes in the center member, pilot ring and hub of the coupling for ease of assembly and disassembly of the coupling. The same bolts are used to both assemble the coupling for normal operation and disassemble the coupling.

11 Claims, 2 Drawing Figures

PILOTED FLEXIBLE COUPLING

BACKGROUND OF THE INVENTION

The present invention relates to flexible torque transmission couplings having a piloted center member and more particularly to such a coupling wherein the same hardware is utilized in both the assembly and disassembly of the coupling.

Some flexible torque transmission couplings, such as that disclosed in U.S. Pat. No. 4,055,966, employ a pilot ring to maintain alignment of the flexing element with its associated hub to insure that the coupling is balanced when it is installed. The piloting is accomplished by providing radially directed precision finished surfaces on the hub and the pilot ring which engage one another to maintain alignment of the coupling after it has been balanced.

Some difficulty may be encountered, however, in attempting to assemble and disassemble the coupling in the field. The pilot ring may be difficult to remove from the hub often requiring the use of tools to pry the pilot ring from the hub which sometimes results in damage to the precision finished surfaces thereby upsetting the balance of the coupling when it is reassembled. Also, prying tools are not normally used to disassemble or assemble couplings of this type, therefore, additional tools must be made available.

SUMMARY OF THE INVENTION

The present invention overcomes the foregoing difficulties associated with assembly and disassembly of piloted flexible torque transmission couplings while employing the same hardware for both operations.

The coupling of the present invention includes a hub having a radially directed precision finished surface on its flange. In the flange are circumferentially spaced holes through which fastening means, such as self-locking hex head bolts, can pass.

Adjacent the hub is a pilot ring having a mating radially directed precision finished surface for aligning the pilot ring with the hub to maintain coupling balance. The pilot ring also has circumferentially spaced holes for receiving the fastening means passing through the circumferentially spaced holes in the flange of the hub. In the embodiment shown, self-locking hex head cap screws are used as fasteners; therefore, the holes in the pilot ring are tapped to threadably engage the bolts thereby connecting the pilot ring to the hub during normal operation of the coupling.

The center member of the coupling also has a radially directed flange with circumferentially spaced holes axially aligned with the tapped holes in the pilot ring. Between the flange of the center member and the pilot ring is positioned the flexing element of the coupling. The flexing elements are preferably of a "slabbed" outer peripheral configuration allowing direct axial accessibility to the holes in the center member flange and pilot ring tapped holes. The flexing element is connected to both the center member flange and the pilot ring in well known fashion to provide a flexible joint that accommodates misalignment between the center member and the hub.

The operation of the flexible torque transmission coupling of the present invention will become more apparent from a reading of the following detailed description of the preferred embodiment made with reference to the accompanying drawings in which:

FIG. 1 is a partially cutaway perspective view of a coupling constructed in accordance with the principles of the present invention, and FIG. 2 is a cross-sectional view of a double flexing coupling embodying the present invention.

DESCRIPTION OF THE PREFERRED EMBODIMENT

Figure 1:
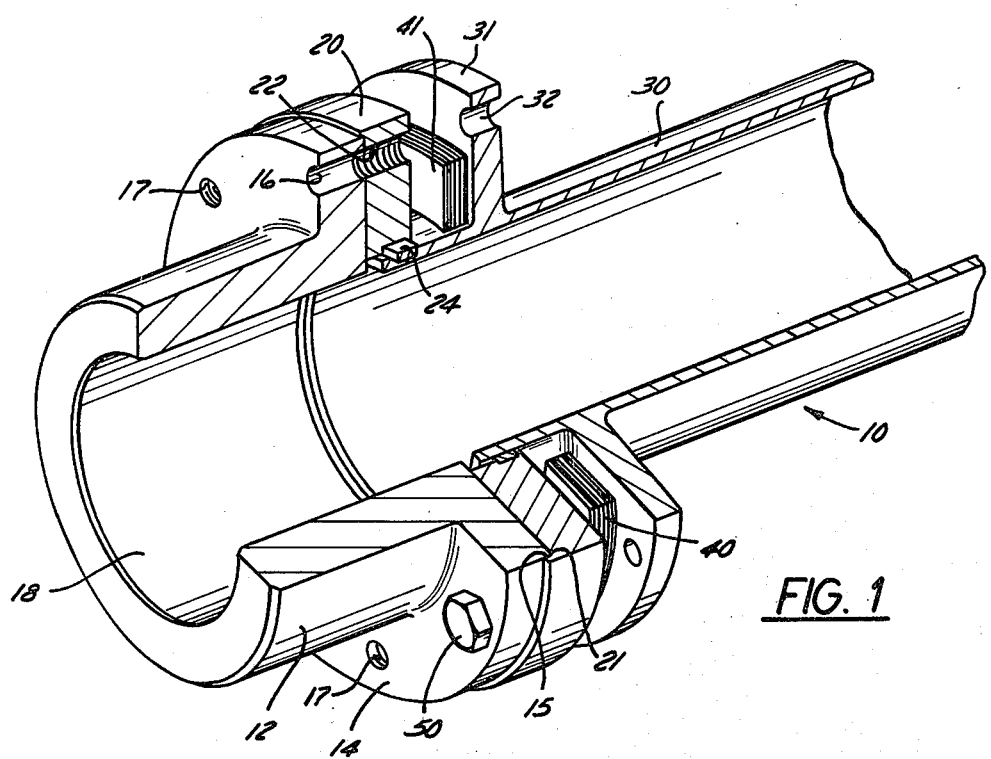

Referring now to FIG. 1, there is shown a flexible torque transmission coupling 10 embodying the present invention. The coupling 10 comprises a hub 12 having a radially directed flange 14 with a precision finished radially directed surface 15 around the circumference of the flange 14. There is a bore 18 in the hub 12 for connection of the coupling 10 to a shaft (not shown). In the flange 14 of the hub 12 there is a plurality of alternately positioned untapped holes 16, and tapped holes 17, extending axially through the flange 14 for reasons to be discussed.

The pilot ring 20 includes a mating radially directed precision finished surface 21 that mates with the precision finished surface 21 that mates with the precision finished surface 15 of the hub 12 to align the pilot ring 20 and thus the flexing element 40 with the hub 12 in a manner well known to those skilled in the art. The pilot ring 20 also has axially directed tapped holes 22 aligned with the untapped holes 16 in the flange 14 of the hub 12 to secure the pilot ring 20 to the hub 12 upon assembly of the coupling.

In the embodiment shown, the axial edge of the center member 30 is positioned inwardly with respect to the radially innermost portion of the pilot ring 20. There is also provided a nonmetallic buffer ring 24 between the pilot ring 20 and the center member 30 to provide a cushion for radial movement of the center member 30 in the event of a catastrophic failure of the flexing element 40.

The center member 30 also has a radially directed flange 31 with circumferentially spaced holes 32 axially aligned with the tapped holes 22 in the pilot ring 20. Spaced between the flange 31 of the center member 30 and the pilot ring 20 is the coupling flexing element 40 shown as comprising a plurality of flexible discs 41 held together in laminated fashion by body bound bolts that are fit into circumferentially spaced holes 43 in the flexible discs 41.

The flexing element 40 is alternately connected to the center member flange 31 and the pilot ring 20 in a well known manner such as by the bolts 46 and nuts 48 shown. Spacers 45 are provided to retain the flexing element 40 approximately in the center of the space between the center member flange 31 and the pilot ring 20. There is thus provided a flexing joint that allows the coupling 10 to accommodate misalignment of the hub 12 and the center member 30.

When the coupling 10 is assembled, self-locking hex head cap screws 50 are inserted through untapped holes 16 of the flange 14 and tightened to threadably engage the tapped holes 22 in the pilot ring 20. The precision finished piloting surfaces 15, 21 are engaged to align the flexing element 40, bolted to the pilot ring 20, with the hub 12. This is the position of the hex head cap screws 50 during normal operation of the coupling.

Figure 2:
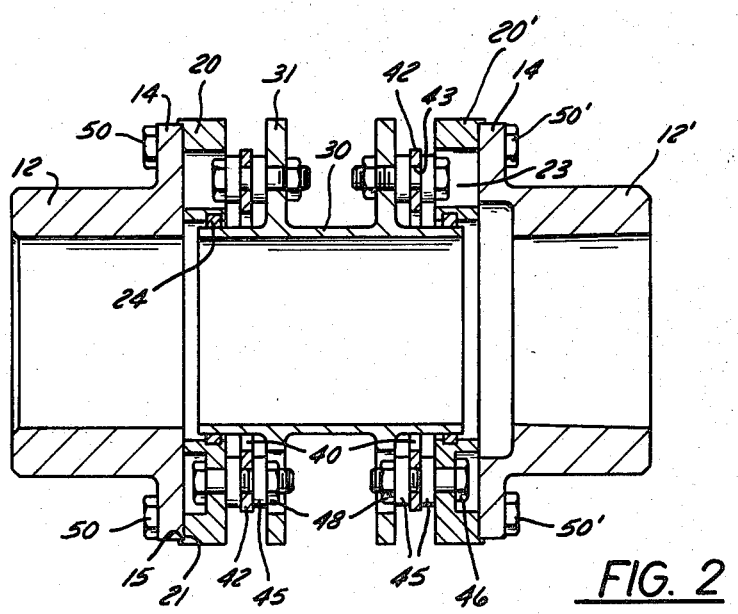

Referring now to FIG. 2, it can be seen that the right half of the coupling is a mirror image of the left half, with the parts of the right half being numbered to correspond to the parts in the left half.

Disassembly of the coupling 10, if required, is accomplished by using the same hex head cap screws 50 used to assemble the coupling 10. The cap screws 50 are loosened, but, due to the close tolerance between the mating precision finished surfaces 15, 21, the pilot ring 20 may be difficult to remove from the hub 12. To remove the pilot ring 20, the cap screws 50 are inserted through the holes 32 in the flange 31 of the center member 30 to threadably engage the tapped holes 22 in the pilot ring 20. As the cap screws 50 are tightened, the flexing joint is compressed and the pilot ring 20 is pulled from one hub 12 of the coupling 10. The pilot ring 20' of the other hub 12' of the coupling 10 may be pushed from its associated hub 12' by positioning the hex head cap screws 50' in the tapped holes 17' of the hub 12' and tightening them so that they push against the pilot ring 20' thereby allowing the coupling 10 to be totally removed.

It is to be noted that the same cap screws 50 are used to both assemble and disassemble the coupling with the only tool required being a readily available wrench. Also, no prying or other force is required to disassemble the coupling 10 thereby reducing the possibility of damaging the precision finished piloting surfaces 15, 21 of the hub 12 and the pilot ring 20.

While the present invention has been described with reference to a preferred embodiment thereof, it will be apparent to those skilled in the art that minor changes and modifications may be made without departing from the spirit and scope of the invention as defined by the appended claims.

I claim:

1. A flexible torque transmission coupling of the type comprising a hub, a center member and a flexing element piloted to said hub by a pilot ring, the improvement comprising:

said hub having a first plurality of circumferentially spaced and axially directed holes and having a second plurality of circumferentially spaced and axially directed holes; said second plurality being tapped and alternately spaced between said first plurality of holes;

said pilot ring having a plurality of circumferentially spaced and axially directed holes circumferentially aligned with the first holes in said hub;

said center member having a plurality of circumferentially spaced and axially directed holes circumferentially aligned with the holes in said pilot ring; and fastening means engageable with said holes to connect said pilot ring to said hub for assembly of said coupling and to remove said pilot ring from said hub to disassemble said coupling.

2. A flexible torque transmission coupling comprising: a hub having a first radially directed flange; said first flange having a plurality of circumferentially spaced axially directed holes, a center member having a second radially directed flange; said second flange having a plurality of circumferentially spaced axially directed holes aligned with the holes in said first flange, a pilot ring having a plurality of circumferentially spaced axially directed tapped holes aligned with the holes in said first flange, a flexing element intermediate said pilot ring and said second flange alternately connected to said pilot ring and said second flange and fastening means engageable with said holes in said first flange and said pilot ring and said second flange and fastening means engageable with said holes in said first flange and said pilot ring to assemble said coupling; said fastening means also being engageable with the holes in said second flange and said pilot ring to disassemble said coupling.

3. A flexible torque transmission coupling as defined in claim 2 wherein the holes in said first and second flanges are untapped and the holes in said pilot ring are tapped to threadably engage said fastening means.

4. A flexible torque transmission coupling as defined in claim 3 wherein said first flange has a second plurality of tapped holes threaded to engage said fastening means; said second plurality of holes being out of alignment with the holes in said pilot ring.

5. A flexible torque transmission coupling as defined in claim 4 wherein the number of said second plurality of holes is equal to the number of said first plurality of holes in said first flange and said first and second pluralities are alternately circumferentially spaced in said first flange.

6. A method for assembling and disassembling a flexible torque transmission coupling having a hub, a center member and a flexing element piloted to the hub by a pilot ring, comprising the steps of:

(A) for assembly,
      i. first, attaching the flexing element to the center member and to the pilot ring;
      ii. next, aligning the pilot ring and the hub; and
      iii. next, bolting the hub to the pilot ring; and then,
   (B) for disassembly,
      i. first, removing the bolts which attach the hub to the pilot ring;
      ii. next, bolting the center member to the pilot ring in order to compress the flexing joint; and
      iii. next, removing the center member and pilot ring from the hub.

7. A method for assembling and disassembling a flexible torque transmission coupling having a hub, a center member and a flexing element piloted to the hub by a pilot ring, comprising the steps of:

(A) for assembly,
      i. first, attaching the flexing element to the center member and to the pilot ring;
      ii. next, aligning the pilot ring and the hub; and
      iii. next, bolting the hub to the pilot ring; and then,
   (B) for disassembly,
      i. first, removing the bolts which attach the hub to the pilot ring; and
      ii. next, screwing the bolts into threaded holes in the hub so as to push against the pilot ring; and
      iii. next, removing the center member and pilot ring from the hub.

8. A flexible torque transmission coupling comprising:

a first member having a first radially directed flange, said first flange having a plurality of circumferentially spaced axially directed holes;

a second member having a second radially directed flange, said second flange having a plurality of circumferentially spaced axially directed holes aligned with the holes in said first flange;

a pilot ring having a surface mating with an associated surface on said first flange and having a plurality of circumferentially spaced axially directed threaded holes aligned with the holes in said first flange;

a flexing element intermediate said pilot ring and said second flange and alternately connected to said second flange and to said pilot ring;

and bolt means engageable with said holes in said first flange, said pilot ring, and said second flange, and including bolt heads larger in diameter than said holes, wherein, for assembly of said coupling, said bolt means may be inserted so as to fasten said pilot ring to said first flange, and, for disassembly, said bolt means may be removed from said first flange and inserted so as to fasten said pilot ring to said second flange.

9. A flexible torque transmission coupling as defined in claim 8, wherein the holes in said first and second flanges are untapped, and the holes in said pilot ring are tapped to threadably engage said bolt means.

10. A flexible torque transmission coupling as recited in claim 9, wherein said first flange has a second plurality of tapped holes threaded to engage said bolt means, said second plurality of holes being out of alignment with the holes in said pilot ring, such that, for disassembly of said coupling, said bolt means may be inserted into said second plurality of holes so as to push said pilot ring away from said first flange.

11. A flexible torque transmission coupling as recited in claim 10, wherein the number of said second plurality of holes is equal to the number of said first plurality of holes in said first flange, and said first and second pluralities are alternately circumferentially spaced in said first flange.

* * * * *